US012626907B2

(12) United States Patent
Jeon et al.

(10) Patent No.: US 12,626,907 B2
(45) Date of Patent: May 12, 2026

(54) ANODE ACTIVE MATERIAL FOR LITHIUM SECONDARY BATTERY AND LITHIUM SECONDARY BATTERY INCLUDING THE SAME

(71) Applicant: SK ON CO., LTD., Seoul (KR)

(72) Inventors: Chan Young Jeon, Daejeon (KR); So Hyun Park, Daejeon (KR); Kyung Hoon Kim, Daejeon (KR)

(73) Assignee: SK On Co., Ltd., Seoul (KR)

( * ) Notice: Subject to any disclaimer, the term of this patent is extended or adjusted under 35 U.S.C. 154(b) by 613 days.

(21) Appl. No.: 18/104,298

(22) Filed: Feb. 1, 2023

(65) Prior Publication Data

US 2023/0253546 A1 Aug. 10, 2023

(30) Foreign Application Priority Data

Feb. 7, 2022 (KR) ........................ 10-2022-0015681

(51) Int. Cl.
| | |
|---|---|
| *H01M 4/36* | (2006.01) |
| *H01M 4/02* | (2006.01) |
| *H01M 4/38* | (2006.01) |
| *H01M 4/583* | (2010.01) |
| *H01M 4/62* | (2006.01) |
| *H01M 10/052* | (2010.01) |

(52) U.S. Cl.
CPC .......... *H01M 4/364* (2013.01); *H01M 4/386* (2013.01); *H01M 4/583* (2013.01); *H01M 4/625* (2013.01); *H01M 10/052* (2013.01); *H01M 2004/021* (2013.01); *H01M 2004/028* (2013.01)

(58) Field of Classification Search
CPC ...... H01M 4/364; H01M 4/386; H01M 4/583; H01M 4/625; H01M 10/052; H01M 2004/021; H01M 2004/028; H01M 4/133; H01M 4/134; H01M 4/366; H01M 4/587; H01M 10/0525; H01M 2004/027; H01M 4/483; H01M 4/622; H01M 4/624; H01M 2220/30; Y02E 60/10
See application file for complete search history.

(56) References Cited

U.S. PATENT DOCUMENTS

| | | | | |
|---|---|---|---|---|
| 2014/0127572 A1* | 5/2014 | Ozaki | ................. | H01M 4/0471 |
| | | | | 429/211 |
| 2019/0088947 A1* | 3/2019 | Piao | ...................... | H01M 4/622 |
| 2021/0305551 A1* | 9/2021 | Choi | ...................... | H01M 4/587 |

FOREIGN PATENT DOCUMENTS

| | | | | |
|---|---|---|---|---|
| KR | 10-2017-0099748 A | 9/2017 | | |
| KR | 10-2018-0029919 A | 3/2018 | | |
| KR | 10-2018-0125235 A | 11/2018 | | |
| KR | 10-2019-0123561 A | 11/2019 | | |
| KR | 10-2020-0020434 A | 2/2020 | | |
| KR | 10-2021-0037657 A | 4/2021 | | |
| KR | 20210037657 A | * | 4/2021 | ............ H01M 4/387 |

* cited by examiner

*Primary Examiner* — Daniel S Gatewood
(74) *Attorney, Agent, or Firm* — IP & T GROUP LLP

(57) ABSTRACT

An anode active material for a secondary battery according to an embodiment of the present invention includes a silicon-based active material, and a graphite-based active material including secondary particles in which a plurality of primary particles are assembled. A ratio of an arithmetic average value of perimeters of the secondary particles relative to a volume average particle diameter (D50) of the secondary particles is maintained within a predetermined range.

15 Claims, 2 Drawing Sheets

ANODE ACTIVE MATERIAL FOR LITHIUM SECONDARY BATTERY AND LITHIUM SECONDARY BATTERY INCLUDING THE SAME

CROSS-REFERENCE TO RELATED APPLICATION

This application claims priority to Korean Patent Application No. 10-2022-0015681 filed on Feb. 7, 2022 in the Korean Intellectual Property Office (KIPO), the entire disclosure of which is incorporated by reference herein.

BACKGROUND

1. Field

The present invention relates to an anode active material for a lithium secondary battery and a lithium secondary battery including the same. More particularly, the present invention relates to an anode active material for a lithium secondary battery including different types of materials and a lithium secondary battery including the same.

2. Description of the Related Art

A secondary battery which can be charged and discharged repeatedly has been widely employed as a power source of a mobile electronic device such as a camcorder, a mobile phone, a laptop computer, etc., according to developments of information and display technologies. The secondary battery includes, e.g., a lithium secondary battery, a nickel-cadmium battery, a nickel-hydrogen battery, etc. The lithium secondary battery is highlighted due to high operational voltage and energy density per unit weight, a high charging rate, a compact dimension, etc.

For example, the lithium secondary battery may include an electrode assembly including a cathode, an anode and a separation layer (separator), and an electrolyte immersing the electrode assembly. The lithium secondary battery may further include an outer case having, e.g., a pouch shape for accommodating the electrode assembly and the electrolyte.

For example, the anode may include a carbon-based active material or silicon-based active material particles as an anode active material. However, when the battery is repeatedly charged/discharged, mechanical and chemical damages of particle cracks may be caused due to operational conditions at high temperature and humidity and the repeated charging/discharging. For example, cracks may occur at an active material particle surface, a contact property between the active material particles may be deteriorated due to a volume change of the active material particles, and a short-circuit of the anodes may occur.

If a composition and a structure of the anode active material are changed to improve stability of the active material particles, an ion and electron conductivity may be degraded and a power of the secondary battery may be deteriorated. Thus, developments of the anode active material capable of enhancing life-span stability and power/capacity properties are needed.

For example, Korean Published Patent Application No. 2017-0099748 discloses an electrode assembly for a lithium secondary battery and a lithium secondary battery including the same.

SUMMARY

According to an aspect of the present invention, there is provided an anode active material for a lithium secondary battery having improved stability and electrical property.

According to an aspect of the present invention, there is provided a secondary battery having improved stability and electrical property.

An anode active material for a secondary battery includes a silicon-based active material, and a graphite-based active material including secondary particles in which a plurality of primary particles are assembled and satisfying Equation 1.

$$4.5 \le P/D \le 9.5 \qquad \text{[Equation 1]}$$

In Equation 1, P is an arithmetic average value of perimeters of the secondary particles measured by a particle image analyzer, and D is a volume average particle diameter (D50) of the secondary particles.

In some embodiments, a ratio of the volume average particle diameter ($D_{50}$) of the secondary particles relative to a volume average particle diameter ($D_{50}$) of the primary particles may be 1.8 or less.

In some embodiments, the ratio of the volume average particle diameter of the secondary particles to the volume average particle diameter of the primary particles may be in a range from 1.2 to 1.8.

In some embodiments, the primary particles may have a volume average particle diameter in a range from 1 μm to 10 μm.

In some embodiments, the volume average particle diameter of the secondary particles may be in a range from 5 μm to 20 μm.

In some embodiments, the arithmetic average value of the perimeters of the secondary particles measured by the particle image analyzer may be in a range from 10 μm to 150 μm.

In some embodiments, a specific surface area of the graphite-based active material measured by a BET method may be in a range from 0.5 $m^2$/g to 5 $m^2$/g.

In some embodiments, the graphite-based active material may include artificial graphite.

In some embodiments, the graphite-based active material may further include a carbon coating covering at least a portion of a surface of each of the secondary particles.

In some embodiments, a content of the carbon coating may be in a range from 0.5 wt % to 6 wt % based on a total weight of the graphite-based active material.

In some embodiments, a ratio of a specific surface area of the graphite-based active material relative to a specific surface area of the secondary particles may be in a range from 0.3 to 0.99.

In some embodiments, the carbon coating may include amorphous carbon.

In some embodiments, the silicon-based active material may include silicon (Si) or silicon oxide (SiOx, 0<x<2).

In some embodiments, a content of the silicon-based active material may be in a range from 1 wt % to 50 wt % based on a total weight of the anode active material for a lithium secondary battery. In some embodiments, a content of the graphite-based active material may be in a range from 50 wt % to 99 wt % based on a total weight of the anode active material for a lithium secondary battery.

In some embodiments, a pressed density of the anode active material for a lithium secondary battery may be 1.2 g/cc or more when pressed at a pressure of 10 MPa.

A lithium secondary battery includes an anode including the anode active material for a lithium secondary battery according to embodiments as described above, and a cathode facing the anode.

According to embodiments of the present invention, an anode active material for a lithium secondary battery includes a silicon-based active material and a graphite-based active material. The anode active material may have improved energy density and charge/discharge capacity by the silicon-based active material, and electrochemical stability of the anode active material may be improved by the graphite-based active material.

The graphite-based active material has a form of secondary particles in which a plurality of primary particles are assembled, and a ratio of a peripheral length of the secondary particle measured by a particle size analyzer relative to a volume average particle diameter of the secondary particle may be adjusted within a predetermined range. Accordingly, a side reaction between the graphite-based active material and an electrolyte may be suppressed, and a resistance of the anode active material may be reduced so that an initial efficiency and a capacity retention of a lithium secondary battery may be improved.

Further, a ratio of a volume average particle diameter of the secondary particles to a volume average particle diameter of the primary particles may have a predetermined value. Accordingly, an internal resistance of the graphite-based active material may be lowered by the primary particles having a small volume average particle diameter, and mobility of lithium ions and electrons may be enhanced. Additionally, a reaction area of the graphite-based active material may be reduced by the secondary particles having a large volume average particle diameter, and electrochemical stability and structural stability of the graphite-based active material may be improved.

The graphite-based active material may include a carbon coating covering at least a portion of a surface of the secondary particle. The carbon coating may block a contact with the electrolyte, and lithium ion conductivity on a surface of the graphite-based active material may be improved by the carbon coating, thereby providing a lithium secondary battery having high capacity and high energy density.

DETAILED DESCRIPTION OF THE EMBODIMENTS

According to exemplary embodiments of the present invention, an anode active material for a secondary battery (hereinafter, that may be abbreviated as an anode active material) includes a silicon-based active material and a graphite-based active material. The graphite-based active material include secondary particles, each of which includes a plurality of primary particles assembled therein.

A lithium secondary battery according to embodiments of the present invention includes an anode including the above-described anode active material for a lithium secondary battery, and a cathode.

Hereinafter, the anode active material and the lithium secondary battery according to embodiments of the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

<Anode Active Material for Lithium Secondary Battery>

An anode active material for a lithium secondary battery includes a silicon-based active material and a graphite-based active material.

In exemplary embodiments, the graphite-based active material may include secondary particles. For example, the graphite-based active material may have a secondary particle shape in which a plurality of primary particles are assembled.

The primary particle may refer to an original particle when another type of particle is formed from a certain particle. For example, the primary particle may be a structure having a single particle shape.

The secondary particle is a particle formed by collecting, assembling or aggregating a plurality of the primary particles, and may refer to a particle that is substantially considered or observed as one particle. For example, the primary particles may aggregate or agglomerate with each other to form an aggregate including a plurality of the primary particles.

For example, a boundary of the primary particles may be detected in a cross-sectional image of a secondary particle measured by a scanning electron microscope (SEM). Orientation directions of the primary particles in the secondary particle may be parallel to each other or may be non-parallel to each other.

Figure 1:
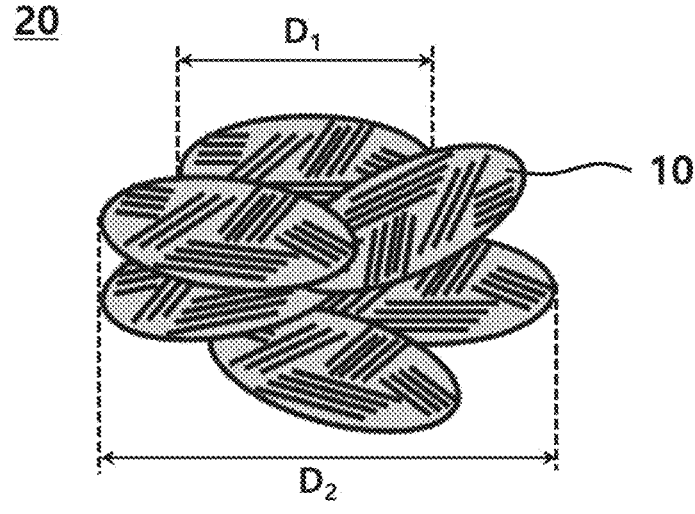
FIG. 1 is a schematic view illustrating a cross-sectional structure of a secondary particle in accordance with exemplary embodiments.

FIG. 1 is a schematic view illustrating a cross-sectional structure of a secondary particle in accordance with exemplary embodiments.

Referring to FIG. 1, the graphite-based active material may include a secondary particle 20 in which a plurality of primary particles 10 are assembled. In FIG. 1, D1 represents a particle diameter of the primary particle 10, and D2 represents a particle diameter of the secondary particle 20.

The graphite-based active material is formed by assembling the primary particles 10 having the relatively small particle diameter D1, and has a form of the secondary particle 20 having the relatively large particle diameter D2, so that life-span properties and charge/discharge efficiency of the anode active material for a lithium secondary battery may be improved.

For example, a moving path of lithium ions or electrons may be shortened by the primary particles 10 having a small volume average particle diameter, and conductivity of ions and electrons may be improved. Accordingly, a resistance of the graphite-based active material may be lowered, and the graphite-based active material may participate in a reaction in a high reaction potential band so that degradation and deterioration of the silicon-based active material may be prevented.

Additionally, the graphite-based active material has the shape of the secondary particle 20, so that a total reaction area of the graphite-based active material may be reduced, and structural and electrochemical stability of the anode active material may be improved.

According to embodiments of the present invention, the graphite-based active material may satisfy Equation 1 below.

$$4.5 \le P/D \le 9.5 \qquad \text{[Equation 1]}$$

In Equation 1, P represents an arithmetic average value of perimeters of the secondary particles measured by a particle image analyzer, and D represents a volume average particle diameter (D50) of the secondary particles.

For example, the volume average particle diameter (D50) may refer to a particle diameter at a volume fraction of 50% in a cumulative particle diameter distribution of target particles. The term "particle diameter" as used herein may refer to the longest length of any particle.

The particle diameter of the secondary particles may be measured using a scanning electron microscope (SEM), a transmission electron microscope (TEM), a light scattering method, or a laser diffraction method. For example, the cumulative particle size distribution of the secondary particles may be measured by dispersing the secondary particles in a dispersion medium and then using a laser diffraction particle size analyzer.

The perimeter of the secondary particle may be measured using the particle image analyzer. For example, a two-dimensional (2D) image of the secondary particle may be photographed using the particle image analyzer, and the longest circumferential length of the analyzed secondary particle may be measured using the photographed two-dimensional image. The term "perimeter of a particle" as used herein may refer to the longest circumferential lengths of the particle.

In Equation 1, P may be an arithmetic average value of the longest circumferential lengths of the 2D images measured by the particle image analyzer. For example, the arithmetic average value of the perimeters of the secondary particles may be a value obtained by measuring the longest circumferential lengths from each of about 10,000 2D images captured using an image analysis program and then arithmetic averaging the measured values.

For example, a specimen in which secondary particle samples are dispersed may be observed using a high-resolution image sensor of a particle analyzer, and the secondary particles may be captured and analyzed as a two-dimensional image to measure the perimeter of the secondary particle. The specimen may be prepared by dropping 1 mm$^3$ of the secondary particle sample onto a glass sample plate and dispersing by supplying an air pressure of 3 bar.

Alternatively, a specimen in which the secondary particle sample is mixed with water or an ethanol solvent may be prepared, and then the secondary particles dispersed in the solvent may be captured and analyzed as a two-dimensional image using a dynamic camera to measure the perimeter of the secondary particle. For example, the specimen may be prepared by mixing and dispersing 1 mm$^3$ of the secondary particle sample with water or an ethanol solvent, and inserting the mixture between two glass sample plates.

For example, Mastersizer, Morphologi G3 or Morphologi 4 manufactured by Malvern, or Sync manufactured by Microtact may be used as the particle image analyzer.

The graphite-based active material may satisfy Equation 1 as described above, the resistance of the graphite-based active material may be lowered, and life-span properties and storage stability may be improved as the overall reaction area may be reduced.

For example, if the graphite-based active material has a P/D of less than 4.5, the reaction area may be decreased to increase the resistance, and power properties of the lithium secondary battery may be deteriorated. For example, if the P/D of the graphite-based active material is greater than 9.5, the reaction area of the secondary particles may be increased, and side reactions due to long-term storage and repeated charging and discharging may easily occur, resulting in deterioration of the life-span properties of the lithium secondary battery.

In some embodiments, in Equation 1, P/D may be in a range from 4.5 to 9.1, e.g., from 4.5 to 8.0, or from 4.5 to 7.5. Within the above range, reaction stability of the graphite-based active material may be improved, and the lithium secondary battery may have high initial efficiency and capacity retention.

Preferably, in Equation 1, P/D may be in a range from 5.0 to 7.5, more preferably from 5.5 to 7.5. Accordingly, the structural stability and low resistance properties of the graphite-based active material may be further improved, and the secondary battery having high efficiency and enhanced life-span may be provided.

In some embodiments, the secondary particle may have a perimeter in a range from 10 µm to 150 µm, preferably from 50 µm to 120 µm. Within the above range, the reaction area of the secondary particles may be properly maintained, and the charge/discharge capacity and life-span properties of the lithium secondary battery may be improved.

For example, if the perimeter of the secondary particle is 10 µm or more, the reaction area may be reduced, and the side reactions between the graphite-based active material and the electrolyte may be suppressed and the life-span properties may be improved. For example, if the circumferential length of the secondary particle is 150 µm or less, insertion/deintercalation of lithium ions may be facilitated, and initial efficiency and power propertied of the lithium secondary battery may be improved.

According to example embodiments, a ratio of the volume average particle diameter (D50) of the secondary particles to a volume average particle diameter (D50) of the primary particles may be 1.8 or less. Within the above range, deterioration of the silicon-based active material due to repeated charging and discharging may be prevented to suppress the volume expansion and short-circuit of the anode active material and the anode.

For example, as the silicon-based active material may react at a higher reaction potential than that of the graphite-based active material, the silicon-based active material may be preferentially charged compared to the graphite-based active material during charging and discharging. In this case, a volume change of the silicon-based active material may occur due to repetitive charging and discharging, and a stress due to the volume expansion may be applied on the silicon-based active material. Accordingly, the silicon-based active material may be degraded or deteriorated due to the stress acting on the silicon-based active material, and the charge/discharge capacity and efficiency of the lithium secondary battery may be lowered.

In exemplary embodiments, the primary particle and the secondary particle may have the above-described volume average particle diameter ratio, so that resistance of the graphite-based active material may be lowered and polarization within an electrode may be suppressed. Accordingly, the graphite-based active material may have a high reaction potential. Thus, the graphite-based active material may participate in a reaction in a reaction potential band where the silicon-based active material may react, so that the volume expansion and deterioration of the silicon-based active material may be prevented.

Preferably, the ratio of the volume average particle diameter of the secondary particles to the volume average particle diameter of the primary particles may be in a range from 1.2 to 1.8, more preferably from 1.4 to 1.7. Within the above range, the graphite-based active material may have low resistance and high structural stability. Therefore, degradation and deterioration of the silicon-based active material may be suppressed, and the life-span properties and charge/discharge capacity of the lithium secondary battery may be further improved.

In some embodiments, the volume average particle diameter of the primary particles may be in a range from 1 μm to 10 μm, preferably from 5 μm to 10 μm. The resistance of the graphite-based active material may be lowered by the primary particles having the fine size within the above range, and the graphite-based active material may participate in the reaction at the high reaction potential, thereby preventing the deterioration and volume expansion of the silicon-based active material.

The volume average particle diameter of the primary particles may be measured using a light scattering method or a laser diffraction method, or may be measured by analyzing images of the secondary particles obtained from a scanning electron microscope (SEM) or a transmission electron microscope (TEM).

In some embodiments, the volume average particle diameter of the secondary particles may be in a range from 5 μm to 20 μm, preferably from 10 μm to 20 μm. Within the above range, the reaction area of the graphite-based active material may be reduced, and structural collapse and capacity loss due to the side reactions with the electrolyte may be prevented.

In some embodiments, the graphite-based active material may include natural graphite or artificial graphite, preferably artificial graphite. For example, the graphite-based active material may include the secondary particles in which a plurality of artificial graphite primary particles are assembled.

Artificial graphite has a stable crystal structure, and a change of the crystal structure may be suppressed even when lithium ions are repeatedly intercalated and deintercalated. Additionally, artificial graphite has a low resistance to react at a reaction potential that is relatively higher than that of natural graphite, so that deterioration of the anode active material due to charging and discharging may be effectively suppressed.

In some embodiments, a specific surface area of the graphite-based active material measured by a BET method may be in a range from 0.5 m²/g to 5 m²/g, preferably from 1.0 m²/g to 4.0 m²/g. Within the above range, the side reaction between the graphite-based active material and the electrolyte may be reduced, and mobility of lithium ions in the anode active material may be enhanced. Accordingly, the initial efficiency and capacity retention of the lithium secondary battery may be improved.

For example, the specific surface area can be measured by a Brunauer-Emmett-Teller (BET) measurement method based on an adsorbed amount of nitrogen gas adsorbed using a specific surface area measuring device.

In exemplary embodiments, the graphite-based active material may include a carbon coating covering at least a portion of a surface of the secondary particle.

A reaction rate with lithium ions on the surface of the graphite-based active material may be increased by the carbon coating present on the surface of the secondary particle. Additionally, the carbon coating may prevent damages and defects of the particles caused by an external environment, and may improve the structural stability of the graphite-based active material by alleviating a stress applied to the particles. Further, the carbon coating may cover protrusions present on the surface of the secondary particle, so that the reaction area may be reduced, and the side reaction between the graphite-based active material and the electrolyte may be reduced.

In some embodiments, a ratio of the specific surface area of the graphite-based active material, e.g., the carbon-coated secondary particle to the specific surface area of the secondary particle may range from 0.3 to 0.99, preferably from 0.6 to 0.8. Within the above range, a coverage ratio of the carbon coating may be increased, and the life-span and power properties of the lithium secondary battery may be improved.

For example, if the specific surface area ratio is less than 0.3, agglomeration may occur between the surface of secondary particles and the carbon coating. In this case, the resistance of the graphite-based active material may be increased, and the reaction area may be decreased, thereby reducing the efficiency and capacity retention of the lithium secondary battery.

For example, if the specific surface area ratio exceeds 0.99, the coating coverage ratio for the secondary particles may be reduced, and the structural stability and life-span properties of the graphite-based active material may be degraded.

In an embodiment, the carbon coating may be discontinuously distributed on the surface of the secondary particle. For example, the carbon coating may be present in the form of individual islands at local regions of the surface of the secondary particles.

In an embodiment, the carbon coating may be continuously and uniformly formed on the surface of the secondary particle. For example, the carbon coating may have a film shape covering at least a portion of the surface of the secondary particle.

Preferably, the carbon coating may have a film shape continuously covering the surface of the secondary particle. For example, the carbon coating may cover 80% or more of the surface of the secondary particle, preferably 90% or more.

In some embodiments, an amount of the carbon coating may be in a range from 0.5 weight percent (wt %) to 6 wt %, preferably from 0.75 wt % to 3 wt %, based on a total weight of the graphite-based active material.

If the content of the carbon coating is less than 0.5 wt %, the coating coverage ratio on the outer surface of the secondary particle may be reduced, and the life-span properties of the lithium secondary battery may be deteriorated. If the content of the carbon coating exceeds 6 wt %, the carbon coating may be excessively present on the surface of the particles, and thus agglomeration of the carbon-based materials or particles may occur. As a result, a non-uniform coating layer may be formed on the surface of the particle, and the life-span properties and high-temperature performance of the anode active material may be degraded.

In some embodiments, the carbon coating may include amorphous carbon. For example, the amorphous carbon may include hard carbon, soft carbon, calcined coke, or mesophase pitch carbide.

When the carbon coating has low crystallinity or non-crystallinity, hardness and durability of the carbon coating may be improved. Thus, cracks and defects of the graphite-based active material particles caused by the external environment and repetitive charge-discharge operation may be prevented, and a pressure caused by the expansion of the silicon-based active material may be effectively controlled.

In some embodiments, the content of the graphite-based active material may be in a range from 50 wt % to 99 wt/o, or from 60 wt % to 99 wt % based on a total weight of the anode active material. If the content of the graphite-based active material is less than 50 wt %, electrochemical stability of the anode active material and life-span properties of the lithium secondary battery may be deteriorated. If the content of the graphite-based active material is greater than 99 wt %, the initial efficiency and charge/discharge capacity may be lowered as the content of the silicon-based active material having a relatively high energy density decreases.

The silicon-based active material may have high reversible capacity and energy density, so that power property and charge/discharge capacity of the lithium secondary battery may be improved by using the silicon-based active material.

In exemplary embodiments, the anode active material includes both the silicon-based active material and the above-described graphite-based active material, so that the lithium secondary battery may have high capacity and power properties, and cycle properties of the lithium secondary battery may be improved. For example, an energy density of the anode active material may be improved by the silicon-based active material, and deterioration of the silicon-based active material may be prevented by the graphite-based active material so that life-span properties of the anode active material may be improved.

In some embodiments, the silicon-based active material may include silicon (Si), silicon oxide (SiOx, 0<x<2), and a silicon-metal alloy, preferably may include Si or SiOx. These may be used alone or in combination thereof.

In some embodiments, the silicon oxide (SiOx) may include a lithium compound or a magnesium compound. For example, the SiOx containing the lithium compound or the magnesium compound may be a SiOx pretreated with lithium or magnesium. For example, the SiOx containing the lithium compound or the magnesium compound may include lithium silicate or magnesium silicate.

In some embodiments, a content of the silicon-based active material may be in a range from 1 wt % to 50 wt %, or from 1 wt % to 30 wt % based on the total weight of the anode active material. Within this range, the lithium secondary battery may have a high energy density, and an irreversible capacity loss during repeated charging and discharging may be suppressed.

In some embodiments, the anode active material for a lithium secondary battery may have a pressed density of 1.2 g/cc or more, and e.g., from 1.3 g/cc to 2.5 g/cc when pressed at a pressure of 10 MPa.

The anode active material includes the above-described graphite-based active material to have high packing property and structural stability. Accordingly, even when being pressed at a low pressure, a high pressed density may be obtained, and an energy density per unit volume of the anode active material may be increased. Thus, structural damages and cracks of active material particles caused by high pressure may be prevented, and thus the initial efficiency and life-span properties of the lithium secondary battery may be improved.

<Lithium Secondary Battery>

A lithium secondary battery according to exemplary embodiments may include a cathode and an anode disposed to face the cathode. The anode may include the anode active material for a lithium secondary battery according to the anode-described embodiments.

Figure 2:
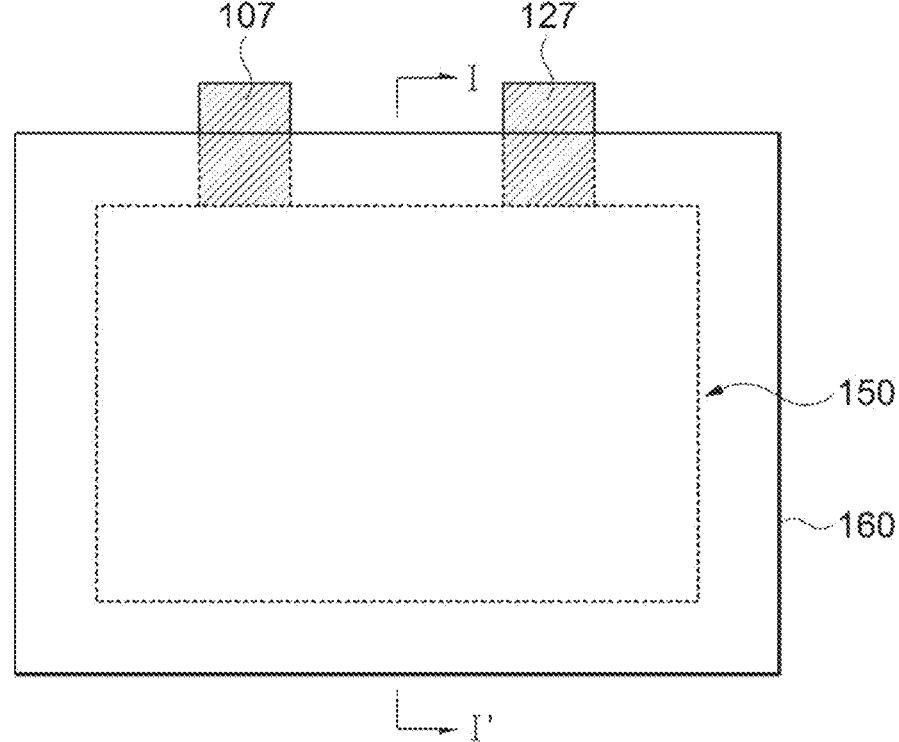
FIG. 2 is a schematic top planar view illustrating a secondary battery according to exemplary embodiments.
Figure 3:
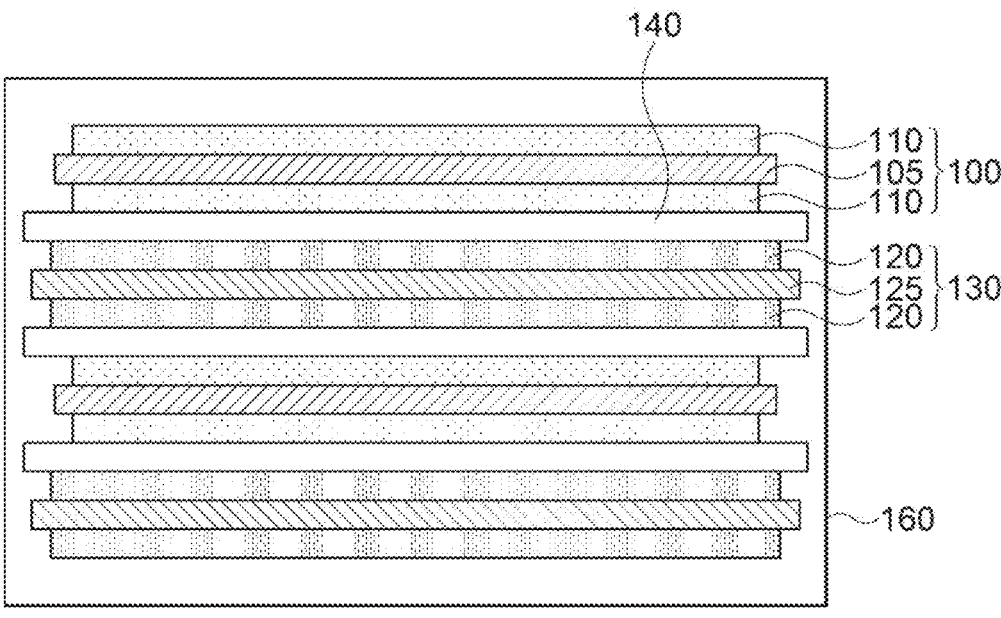
FIG. 3 is a schematic cross-sectional view illustrating a secondary battery according to exemplary embodiments.

FIGS. 2 and 3 are a schematic top planar view and a schematic cross-sectional view, respectively, illustrating a secondary battery according to exemplary embodiments. For example, FIG. 3 is a cross-sectional view taken along a line I-I' in FIG. 2 in a thickness direction of the lithium secondary battery.

Referring to FIGS. 2 and 3, the secondary battery may serve as a lithium secondary battery. In exemplary embodiments, the secondary battery may include an electrode assembly 150 and a case 160 accommodating the electrode assembly 150. The electrode assembly 150 may include an anode 100, a cathode 130 and a separation layer 140.

The cathode 100 may include a cathode current collector 105 and a cathode active material layer 110 formed on at least one surface of the cathode current collector 105. In exemplary embodiments, the cathode active material layer 110 may be formed on both surfaces (e.g., upper and lower surfaces) of the cathode current collector 105. For example, the cathode active material layer 110 may be coated on each of the upper and lower surfaces of the cathode current collector 105, and may be directly coated on the surface of the cathode current collector 105.

The cathode current collector 105 may include stainless-steel, nickel, aluminum, titanium, copper or an alloy thereof. Preferably, aluminum or an alloy thereof may be used.

The cathode active material layer 110 may include a lithium metal oxide as a cathode active material. In exemplary embodiments, the cathode active material may include a lithium (Li)-nickel (Ni)-based oxide.

In some embodiments, the lithium metal oxide included in the cathode active material layer 110 may be represented by Chemical Formula 1 below.

$$Li_{1+a}Ni_{1-(x+y)}Co_xM_yO_2 \qquad \text{[Chemical Formula 1]}$$

In the Chemical Formula 1 above, $-0.05 \leq a \leq 0.15$, $0.01 \leq x \leq 0.2$, $0 \leq y \leq 0.2$, and M may include at least one element selected from Mg, Sr, Ba, B, Al, Si, Mn, Ti, Zr and W. In an embodiment, $0.01 \leq x \leq 0.20$, $0.01 \leq y \leq 0.15$ in Chemical Formula 1.

Preferably, in Chemical Formula 1, M may be manganese (Mn). In this case, nickel-cobalt-manganese (NCM)-based lithium oxide may be used as the cathode active material.

For example, nickel (Ni) may serve as a metal related to a capacity of a lithium secondary battery. As the content of nickel increases, capacity of the lithium secondary battery may be improved. However, if the content of nickel is excessively increased, life-span may be decreased, and mechanical and electrical stability may be degraded.

For example, cobalt (Co) may serve as a metal related to conductivity or resistance. In an embodiment, M may include manganese (Mn), and Mn may serve as a metal related to mechanical and electrical stability of the lithium secondary battery.

Capacity, power, low resistance and life-span stability may be improved together from the cathode active material layer 110 by the above-described interaction between nickel, cobalt and manganese.

For example, a slurry may be prepared by mixing and stirring the cathode active material with a binder, a conductive material and/or a dispersive agent in a solvent. The slurry may be coated on the cathode current collector 105, and then dried and pressed to form the cathode active material layer 110.

The binder may include an organic based binder such as a polyvinylidene fluoride-hexafluoropropylene copolymer (PVDF-co-HFP), polyvinylidenefluoride (PVDF), polyacrylonitrile, polymethylmethacrylate, etc., or an aqueous based binder such as styrene-butadiene rubber (SBR) that may be used with a thickener such as carboxymethyl cellulose (CMC).

For example, a PVDF-based binder may be used as a cathode binder. In this case, an amount of the binder for forming the cathode active material layer 110 may be reduced, and an amount of the cathode active material or lithium metal oxide particles may be relatively increased. Thus, capacity and power of the lithium secondary battery may be further improved.

The conductive material may be added to facilitate an electron mobility between active material particles. For example, the conductive material may include a carbon-based material such as graphite, carbon black, graphene, carbon nanotube, etc., and/or a metal-based material such as tin, tin oxide, titanium oxide, zirconium oxide, a metal fiber, etc.

In some embodiments, an electrode density of the cathode 100 may be in a range from 3.0 g/cc to 3.9 g/cc, preferably from 3.2 g/cc to 3.8 g/cc.

The anode 130 may include an anode current collector 125 and an anode active material layer 120 formed on at least one surface of the anode current collector 125. In exemplary embodiments, the anode active material layer 120 may be formed on both surfaces (e.g., upper and lower surfaces) of the anode current collector 125.

The anode active material layer 120 may be coated on each of the upper and lower surfaces of the anode current collector 125. For example, the anode active material layer 120 may directly contact the surface of the anode current collector 125.

The anode current collector 125 may include gold, stainless steel, nickel, aluminum, titanium, copper, or an alloy thereof, preferably may include copper or a copper alloy.

In some embodiments, the anode active material layer 120 may include the above-described anode active material. For example, an anode slurry may be prepared by mixing and stirring the anode active material with a binder, a conductive material and/or a dispersive agent in a solvent. The anode slurry may be applied (coated) on the anode current collector 125, and then dried and pressed to form the anode active material layer 120.

The binder and the conductive material substantially the same as or similar to those used for forming the cathode 100 may be used in the anode 130. In some embodiments, the binder for forming the anode 130 may include, e.g., styrene-butadiene rubber (SBR) or an acrylic binder for compatibility with the graphite-based active material, and carboxymethyl cellulose (CMC) may also be used as a thickener.

In exemplary embodiments, an electrode density of the anode 130 may be 1.4 g/cc to 1.9 g/cc.

In some embodiments, an area and/or a volume of the anode 130 (e.g., a contact area with the separation layer 140) may be greater than that of the cathode 100. Thus, lithium ions generated from the cathode 100 may be easily transferred to the anode 130 without a loss by, e.g., precipitation or sedimentation to further improve power and capacity of the secondary battery.

The separation layer 140 may be interposed between the cathode 100 and the anode 130. The separation layer 140 may include a porous polymer film prepared from, e.g., a polyolefin-based polymer such as an ethylene homopolymer, a propylene homopolymer, an ethylene/butene copolymer, an ethylene/hexene copolymer, an ethylene/methacrylate copolymer, or the like. The separation layer 140 may also include a non-woven fabric formed from a glass fiber with a high melting point, a polyethylene terephthalate fiber, or the like.

The separation layer 140 may extend in a width direction of the secondary battery between the cathode 100 and the anode 130, and may be folded and wound along a thickness direction of the lithium secondary battery. Accordingly, a plurality of the anodes 100 and the cathodes 130 may be stacked in the thickness direction using the separation layer 140.

In exemplary embodiments, an electrode cell may be defined by the cathode 100, the anode 130 and the separation layer 140, and a plurality of the electrode cells may be stacked to form the electrode assembly 150 that may have e.g., a jelly roll shape. For example, the electrode assembly 150 may be formed by winding, laminating or folding of the separation layer 140.

The electrode assembly 150 may be accommodated together with an electrolyte in the case 160 to define the lithium secondary battery. The case 160 may include, e.g., a pouch, a can, etc.

In exemplary embodiments, a non-aqueous electrolyte may be used as the electrolyte.

The non-aqueous electrolyte solution may include a lithium salt and an organic solvent. The lithium salt may be represented by $Li^+X^-$, and an anion of the lithium salt $X^-$ may include, e.g., $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, etc.

The organic solvent may include, e.g., propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxy ethane, diethoxy ethane, vinylene carbonate, sulfolane, gamma-butyrolactone, propylene sulfite, tetrahydrofuran, etc. These may be used alone or in a combination of two or more therefrom.

As illustrated in FIG. 2, electrode tabs (a cathode tab and an anode tab) may protrude from the cathode current collector 105 and the anode current collector 125 included in each electrode cell to one side of the case 160. The electrode tabs may be welded together with the one side of the case 160 to be connected to an electrode lead (a cathode lead 107 and an anode lead 127) that may be extended or exposed to an outside of the case 160.

FIG. 2 illustrates that the cathode lead 107 and the anode lead 127 are positioned at the same side of the lithium secondary battery or the case 160, but the cathode lead 107 and the anode lead 127 may be formed at opposite sides to each other.

For example, the cathode lead 107 may be formed at one side of the case 160, and the anode lead 127 may be formed at the other side of the case 160.

The lithium secondary battery may be manufactured in, e.g., a cylindrical shape using a can, a square shape, a pouch shape or a coin shape.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

Synthesis Example

1. Preparation of Graphite-Based Active Material
(1) A-1 to A-4 and A-6 to A-8
100 g of an artificial graphite powder in the form of primary particles each having an average particle diameter shown in Table 1 below was prepared. The artificial graphite primary particles and pitch were mixed in a weight ratio of 90:10 and calcined at a temperature of 600° C. for 10 hours to prepare secondary particles in which the primary particles were assembled. The prepared secondary particles were 4. Measurement of Specific Surface Area A specific surface area of the graphite-based active material as prepared above was measured by a BET method by a nitrogen gas adsorption using a specific surface area measuring device (BELSORP-mino II).

TABLE 1

| No. | primary particles $D_{50}$ (µm) (A) | secondary particles $D_{50}$ (µm) (B) | B/A | perimeter of secondary particles (µm) (C) | C/B | content of surface coating (wt. %) | specific surface area ($m^2$/g) | specific surface area after coating/ before coating |
|---|---|---|---|---|---|---|---|---|
| A-1 | 8.5 | 13.7 | 1.61 | 103 | 7.5 | 3 | 1.4 | 0.68 |
| A-2 | 9.5 | 13.2 | 1.38 | 75 | 5.7 | 2 | 1.04 | 0.71 |
| A-3 | 9.0 | 12.9 | 1.43 | 61 | 4.7 | 1.5 | 1.18 | 0.73 |
| A-4 | 4.3 | 6.9 | 1.60 | 51 | 7.4 | 3 | 2.18 | 0.61 |
| A-5 | 8.5 | 13.5 | 1.59 | 98 | 7.3 | — | 1.95 | — |
| A-6 | 8.5 | 15.4 | 1.81 | 137 | 9.0 | 1.5 | 1.34 | 0.72 |
| A-7 | 9.5 | 17.8 | 1.87 | 69 | 3.9 | 1.5 | 0.85 | 0.60 |
| A-8 | 9.5 | 19.8 | 2.08 | 88 | 4.4 | 2 | 0.72 | 0.51 | sieved and classified using an air classifying mill to obtain secondary particles satisfying an average particle diameter and a perimeter of Table 1 below.

Thereafter, pitch was used as a coating agent and fired at 1000° C. to prepare secondary particles coated with amorphous carbon. The carbon coating was formed so that the content of the carbon coating satisfied wt % of Table 1.

In Table 1 below, a specific surface area of a graphite-based active material was measured, and the "specific surface area after/before coating" was measured as a ratio of a specific surface area of the secondary particles after the carbon coating relative to a specific surface area of the secondary particles before the carbon coating.

(2) A-5

100 g of an artificial graphite powder in the form of primary particles having an average particle diameter shown in Table 1 below was prepared. The artificial graphite primary particles and pitch were mixed in a weight ratio of 90:10 and calcined at a temperature of 600° C. for 10 hours to prepare secondary particles in which the primary particles were assembled. The prepared secondary particles were sieved and classified using an air flow classifier to obtain secondary particles having an average particle diameter shown in Table 1 below.

2. Measurement of Volume Average Particle Diameter (D50)

The primary particles and the secondary particles used in the preparation of the graphite-based active material were each dispersed in a dispersion medium (ethyl alcohol, 94.5%), and a diffraction pattern according to a particle size was analyzed using a laser diffraction particle size meter (Horiba, LA-960) to obtain an average diameter. The particle diameter at a point where a volume fraction became 50% was measured to obtain average particle diameters of the primary particles and secondary particles.

3. Measurement of Perimeter Length

1 $mm^3$ of each of the prepared secondary particles was dropped onto glass and dispersed by applying an air pressure of 3 bar to prepare a specimen. Thereafter, 10,000 two-dimensional images of each of the secondary particles were taken using a particle shape analyzer (Morphologi 4, Malvern). A perimeter of the two-dimensional image was measured using an image analysis program of a particle shape analyzer, and then an arithmetic average value of the measured perimeters was obtained.

Examples and Comparative Examples

An anode slurry satisfying the composition and content of Table 2 was prepared. SiOx particles having an average particle diameter of 5 µm as a silicon-based active material, carbon nanotubes (CNT) as a conductive material, carboxylmethyl cellulose (CMC) as a thickener, and SBR as a binder were used.

The prepared anode slurry was coated on a Cu foil, dried and pressed to form an anode having a mixture density of 13 mg/cm$^2$ (based on a cross section) and 1.7 g/cc was prepared.

A secondary battery in the form of a coin cell was manufactured using a Li foil as a counter electrode and using an electrolyte containing 1 wt % of FEC, 1.0M LiPF$_6$ and a mixed solvent of EC:EMC=3:7.

TABLE 2

| No. (weight parts) | silicon-based active material | graphite-based active material | con-ductive material | thick-ener | binder |
|---|---|---|---|---|---|
| Example 1 | 10 | 90 (A-1) | 3.2 | 1.6 | 1.3 |
| Example 2 | 10 | 90 (A-2) | 3.2 | 1.6 | 1.3 |
| Example 3 | 10 | 90 (A-3) | 3.2 | 1.6 | 1.3 |
| Example 4 | 10 | 90 (A-4) | 3.2 | 1.6 | 1.3 |
| Example 5 | 10 | 90 (A-5) | 3.2 | 1.6 | 1.3 |
| Example 6 | 10 | 90 (A-6) | 3.2 | 1.6 | 1.3 |
| Example 7 | 30 | 70 (A-1) | 3.2 | 1.6 | 1.3 |
| Example 8 | 20 | 80 (A-1) | 3.2 | 1.6 | 1.3 |
| Example 9 | 5 | 95 (A-1) | 3.2 | 1.6 | 1.3 |
| Example 10 | 20 | 80 (A-2) | 3.2 | 1.6 | 1.3 |
| Example 11 | 5 | 95 (A-2) | 3.2 | 1.6 | 1.3 |
| Comparative Example 1 | — | 100 (A-1) | 3.2 | 1.6 | 1.3 |
| Comparative Example 2 | 100 | — | 3.2 | 1.6 | 1.3 |

TABLE 2-continued

| No. (weight parts) | silicon-based active material | graphite-based active material | con-ductive material | thick-ener | binder |
|---|---|---|---|---|---|
| Comparative Example 3 | 10 | 90 (A-7) | 3.2 | 1.6 | 1.3 |
| Comparative Example 4 | 10 | 90 (A-8) | 3.2 | 1.6 | 1.3 |

Experimental Example (1) Evaluation on Power Property

Charge (CC/CV, rate 2.0C, upper limit voltage 1.5V, cut-off current 0.01C) and discharge (CC, 0.1C, lower limit voltage 0.01V cut-off) at 25° C. for the secondary batteries according to Examples and Comparative Examples—off) were performed to measure a percentage of an initial discharge capacity to an initial charge capacity.

(2) Evaluation on Life-Span Property

Charge (CC/CV, rate 1.0C, upper limit voltage 1.5V, cut-off current 0.01C) and discharge (CC, 1.0C, lower limit voltage 0.01V cut-off) at 25° C. for the secondary batteries according to Examples and Comparative Examples to measure an initial discharge capacity.

The above charge and discharge was set as one cycle, and 29 additional cycles of were performed. A life-span property was evaluated as a percentage of a discharge capacity at the 30th cycle relative to the initial discharge capacity.

The evaluation results are shown in Table 3 below.

TABLE 3

| No. | power property (%) | life-span property (%) |
|---|---|---|
| Example 1 | 84 | 76 |
| Example 2 | 82 | 78 |
| Example 3 | 86 | 75 |
| Example 4 | 81 | 70 |
| Example 5 | 80 | 71 |
| Example 6 | 85 | 66 |
| Example 7 | 86 | 70 |
| Example 8 | 85 | 72 |
| Example 9 | 81 | 78 |
| Example 10 | 82 | 74 |
| Example 11 | 79 | 78 |
| Comparative Example 1 | 69 | 85 |
| Comparative Example 2 | 84 | 56 |
| Comparative Example 3 | 79 | 69 |
| Comparative Example 4 | 82 | 65 |

Referring to Table 3, in the secondary batteries including the anode active material according to Examples, the power and life-span properties were generally improved.

In Examples 1 to 4 where the graphite-based active material included the carbon coating, a lithium ion conductivity was improved to provide high power property, and the reaction area and side reaction were reduced to also improve life-span property.

In the lithium secondary battery including the anode active material according to Comparative Examples, the power and life-span properties were degraded compared to those from Examples.

In Comparative Example 1 without the silicon-based active material, an energy density was decreased and the power property was deteriorated. In Comparative Example 2 without the graphite-based active material, the silicon-based active material was degraded by repeated charging and discharging, and the life-span property of the lithium secondary battery was deteriorated.

In Comparative Examples 3 and 4 where the ratio of the average particle diameter of the secondary particles to the average particle diameter of the primary particles of the graphite-based active material exceeded 1.8, and the ratio of the perimeter of the secondary particles to the average particle diameter of the secondary particles did not satisfy Equation 1, the life-span and power properties were deteriorated.

What is claimed is:

1. An anode active material for a lithium secondary battery, comprising:

a silicon-based active material; and a graphite-based active material comprising secondary particles in which a plurality of primary particles are assembled and satisfying Equation 1:

$$4.5 \leq P/D \leq 9.5 \qquad \text{[Equation 1]}$$

wherein, in Equation 1, P is an arithmetic average value of perimeters of the secondary particles measured by a particle image analyzer, and D is a volume average particle diameter (D50) of the secondary particles, and wherein the arithmetic average value of the perimeters of the secondary particles measured by the particle image analyzer is in a range from 10 μm to 150 um.

2. The anode active material for a lithium secondary battery according to claim 1, wherein a ratio of the volume average particle diameter ($D_{50}$) of the secondary particles relative to a volume average particle diameter ($D_{50}$) of the primary particles is 1.8 or less.

3. The anode active material for a lithium secondary battery according to claim 2, wherein the ratio of the volume average particle diameter of the secondary particles to the volume average particle diameter of the primary particles is 1.2 to 1.8.

4. The anode active material for a lithium secondary battery according to claim 2, wherein the primary particles have a volume average particle diameter in a range from 1 μm to 10 μm.

5. The anode active material for a lithium secondary battery according to claim 1, wherein the volume average particle diameter of the secondary particles is in a range from 5 μm to 20 μm.

6. The anode active material for a lithium secondary battery according to claim 1, wherein a specific surface area of the graphite-based active material measured by a BET method is in a range from 0.5 m²/g to 5 m²/g.

7. The anode active material for a lithium secondary battery according to claim 1, wherein the graphite-based active material includes artificial graphite.

8. The anode active material for a lithium secondary battery according to claim 1, wherein the graphite-based active material further comprises a carbon coating covering at least a portion of a surface of each of the secondary particles.

9. The anode active material for a lithium secondary battery according to claim 8, wherein a content of the carbon coating is in a range from 0.5 wt % to 6 wt % based on a total weight of the graphite-based active material.

10. The anode active material for a lithium secondary battery according to claim 8, wherein a ratio of a specific surface area of the graphite-based active material relative to a specific surface area of the secondary particles is in a range from 0.3 to 0.99.

11. The anode active material for a lithium secondary battery according to claim 8, wherein the carbon coating includes amorphous carbon.

12. The anode active material for a lithium secondary battery according to claim 1, wherein the silicon-based active material includes silicon (Si) or silicon oxide (SiOx, $0<x<2$).

13. The anode active material for a lithium secondary battery according to claim 1, wherein a content of the silicon-based active material is in a range from 1 wt % to 50 wt %, and a content of the graphite-based active material is in a range from 50 wt % to 99 wt %, based on a total weight of the anode active material for a lithium secondary battery.

14. The anode active material for a lithium secondary battery according to claim 1, wherein a pressed density is 1.2 g/cc or more when pressed at a pressure of 10 MPa.

15. A lithium secondary battery, comprising:
    an anode comprising the anode active material for a lithium secondary battery according to claim 1; and
    a cathode facing the anode.

* * * * *